United States Patent
Armstrong et al.

(10) Patent No.: US 10,511,047 B2
(45) Date of Patent: Dec. 17, 2019

(54) ANODE SPLITTER PLATE AND METHODS FOR MAKING THE SAME

(71) Applicant: BLOOM ENERGY CORPORATION, Sunnyvale, CA (US)

(72) Inventors: Tad Armstrong, Burlingame, CA (US); Martin Perry, Mountain View, CA (US); Avinash Verma, Cupertino, CA (US); Michael Petrucha, Santa Clara, CA (US); Dongai Shi, Cupertino, CA (US); Cheng-Yu Lin, Sunnyvale, CA (US); Shruti Baharani, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 155 days.

(21) Appl. No.: 15/422,677

(22) Filed: Feb. 2, 2017

(65) Prior Publication Data

US 2017/0222236 A1    Aug. 3, 2017

Related U.S. Application Data

(60) Provisional application No. 62/290,706, filed on Feb. 3, 2016.

(51) Int. Cl.
*H01M 8/04082* (2016.01)
*H01M 8/2457* (2016.01)
(Continued)

(52) U.S. Cl.
CPC ............ *H01M 8/2483* (2016.02); *B22F 7/08* (2013.01); *B23K 35/304* (2013.01);
(Continued)

(58) Field of Classification Search
CPC ........ B22F 2998/10; B22F 7/062; B22F 3/02; B22F 3/10; B22F 3/1055; B22F 5/08;
(Continued)

(56) References Cited

U.S. PATENT DOCUMENTS 7,713,649 B2    5/2010 Hickey et al.
8,563,180 B2    10/2013 Perry et al.
(Continued)

OTHER PUBLICATIONS

U.S. Appl. No. 15/285,012, filed Oct. 4, 2016, Bloom Energy Corp.

*Primary Examiner* — Barbara L Gilliam
*Assistant Examiner* — Adam A Arciero
(74) *Attorney, Agent, or Firm* — The Marbury Law Group, PLLC

(57) ABSTRACT

Various embodiments of a reactant feed and return assembly, such as an anode splitter plate (ASP), are provided for facilitating reactant feed and exhaust flow in a solid oxide fuel cell (SOFC) stack system. Embodiments include a reactant feed and return assembly including at least a first portion formed of a chromium-based alloy, such as a chromium-iron alloy, having a similar coefficient of thermal expansion as other SOFC components and may therefore reduce internal stress in an SOFC stack. Methods for making an a reactant feed and return assembly comprising a chromium-based alloy are also provided.

19 Claims, 11 Drawing Sheets

(51) Int. Cl.
  *H01M 8/2483* (2016.01)
  *H01M 8/241* (2016.01)
  *H01M 8/04089* (2016.01)
  *B22F 7/08* (2006.01)
  *H01M 8/0297* (2016.01)
  *C22C 38/18* (2006.01)
  *H01M 8/021* (2016.01)
  *C22C 27/06* (2006.01)
  *C22C 19/05* (2006.01)
  *B23K 35/30* (2006.01)
  *C22C 38/00* (2006.01)
  *B23K 35/02* (2006.01)

(52) U.S. Cl.
  CPC .......... *B23K 35/3033* (2013.01); *C22C 19/05* (2013.01); *C22C 19/058* (2013.01); *C22C 27/06* (2013.01); *C22C 38/001* (2013.01); *C22C 38/18* (2013.01); *H01M 8/021* (2013.01); *H01M 8/0297* (2013.01); *H01M 8/04097* (2013.01); *H01M 8/241* (2013.01); *H01M 8/2457* (2016.02); *B22F 2998/10* (2013.01); *B23K 35/025* (2013.01); *Y02P 10/295* (2015.11)

(58) Field of Classification Search
  CPC ......... B22F 7/08; C22C 1/0441; C22C 38/18; H01M 8/021; H01M 8/0297; H01M 8/04097; H01M 8/241; H01M 8/2483; H01M 8/2457; Y02P 10/295
  See application file for complete search history.

(56) References Cited

U.S. PATENT DOCUMENTS

| | | | |
|---|---|---|---|
| 8,785,074 | B2 | 7/2014 | Edmonston et al. |
| 2006/0204827 | A1 | 9/2006 | Hickey et al. |
| 2007/0196704 | A1 | 8/2007 | Valensa et al. |
| 2008/0248349 | A1* | 10/2008 | McElroy ........... H01M 8/04097 429/404 |
| 2011/0076585 | A1* | 3/2011 | Edmonston ....... H01M 8/04089 429/454 |
| 2013/0129557 | A1* | 5/2013 | Herchen ............. H01M 8/0202 419/62 |
| 2014/0272612 | A1 | 9/2014 | Trevisan et al. |
| 2015/0221957 | A1 | 8/2015 | Herchen et al. |

* cited by examiner

| Temp degC | 446 | Chromium-iron alloy | Delta in CTE |
|---|---|---|---|
| 100 | 10.40 | | |
| 200 | 10.60 | | |
| 300 | 10.80 | 8.90 | 1.90 |
| 400 | 11.00 | 9.20 | 1.80 |
| 500 | 11.20 | 9.50 | 1.70 |
| 600 | 11.50 | 9.80 | 1.70 |
| 700 | 11.70 | 10.10 | 1.60 |
| 750 | 11.80 | 10.25 | 1.55 |
| 800 | 11.90 | 10.45 | 1.45 |
| 850 | 12.06 | 10.65 | 1.41 |
| 900 | 12.42 | 10.83 | 1.60 |
| 1000 | 13.14 | 11.25 | 1.89 |

FIG. 6A

| Fe | O | H | Al | N | C | Si | Y | Cr |
|---|---|---|---|---|---|---|---|---|
| 4.5-5.5 | max. 0.15 | max. 0.003 | max. 0.12 | max. 0.03 | max. 0.025 | max. 0.12 | 0.02-0.2 | other |

FIG. 6B

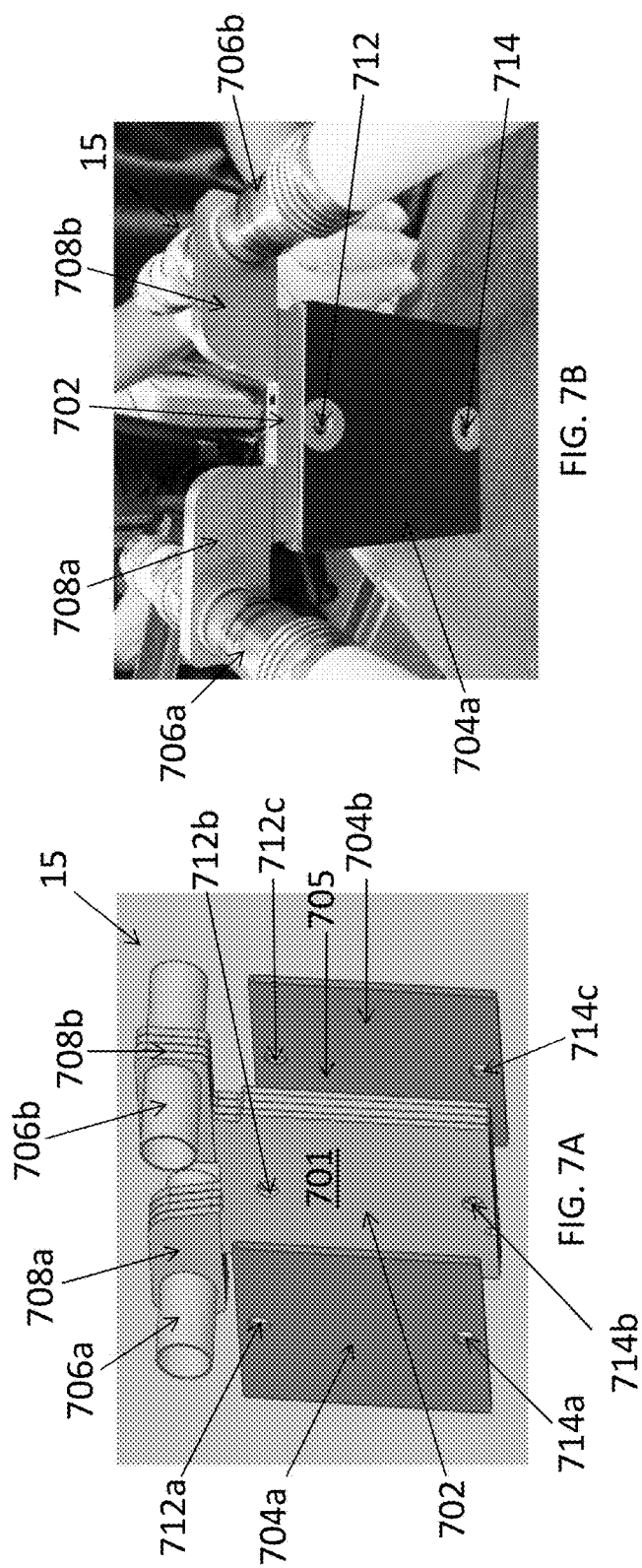

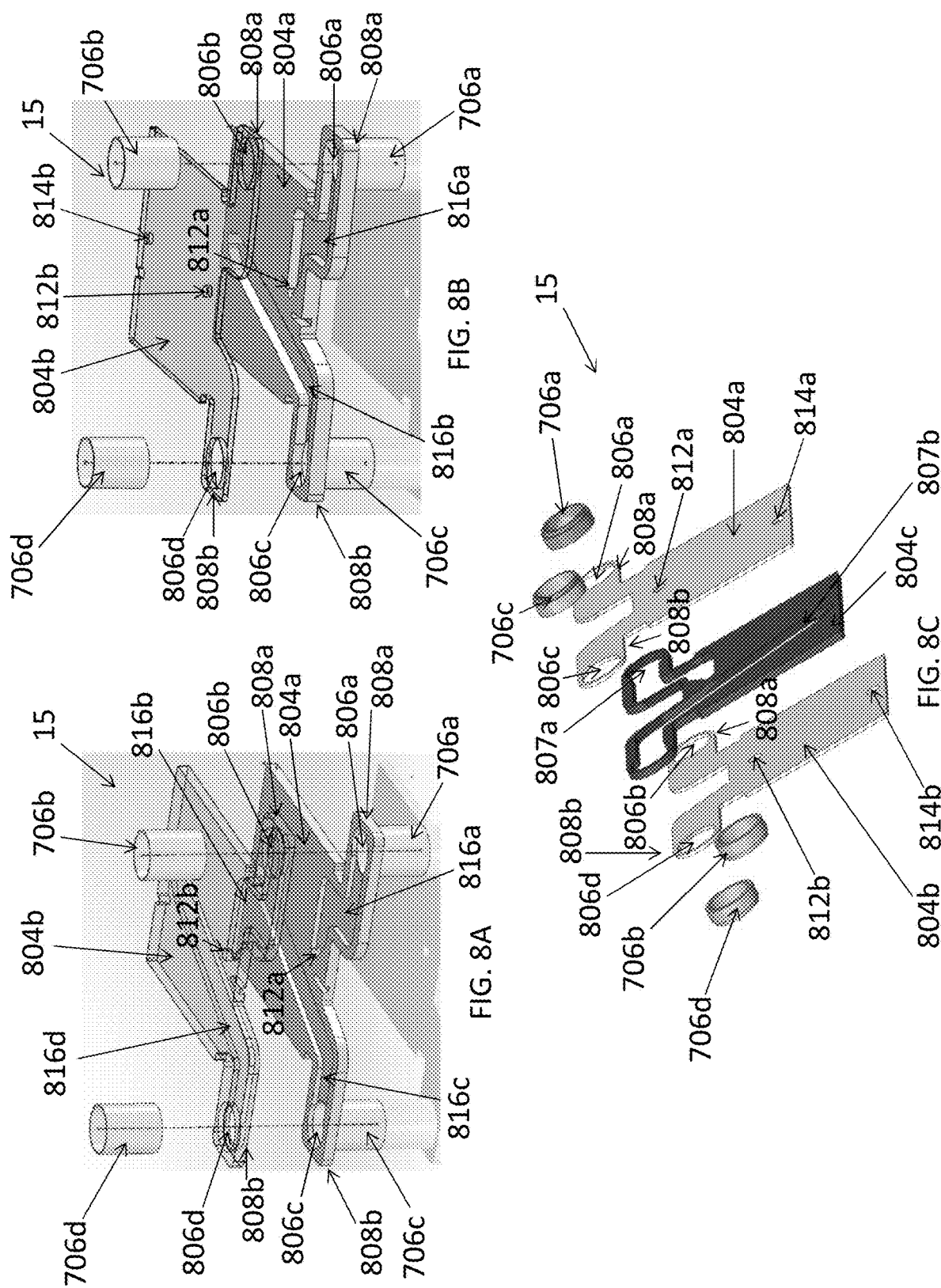

ANODE SPLITTER PLATE AND METHODS FOR MAKING THE SAME

BACKGROUND OF THE INVENTION

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located. Some fuel cell stacks may be internally manifolded for a first reactant (e.g., fuel) and externally manifolded for a second reactant (e.g., air).

A fuel cell power generating system may include one or more fuel cell stacks and a distribution system that provides flow streams of the reactants to the appropriate locations of each fuel cell in the stack(s) and removes exhaust streams from the fuel cells and the stack(s).

SUMMARY OF THE INVENTION

An embodiment includes a reactant feed and return assembly, such as an anode splitter plate (ASP), for a fuel cell stack system that includes a reactant feed opening in the reactant feed and return assembly for fluid engagement with a reactant feed conduit, a reactant exhaust opening in the reactant feed and return assembly for fluid engagement with a reactant exhaust conduit, a reactant feed channel within the reactant feed and return assembly configured to provide fluid communication between the reactant feed conduit and an inlet riser opening of a fuel cell stack, and a reactant exhaust channel within the reactant feed and return assembly configured to provide fluid communication between the anode exhaust conduit and an outlet riser opening of a fuel cell stack, where the reactant feed and return assembly includes at least a first portion made from a chromium-based alloy comprising at least about 80% chromium by weight.

Further embodiments include fuel cell stack systems which include a column having at least a first fuel cell stack and a second fuel cell stack, and a reactant feed and return assembly located between the first fuel cell stack and the second fuel cell stack in the column, where at least the outer surfaces of the reactant feed and return assembly that contact the respective end plates of the first fuel cell stack and the second fuel cell stack is formed of a material that has a coefficient of thermal expansion (CTE) that differs from the CTE of the respective end plates of the first fuel cell stack and the second fuel cell stack by less than $1.3 \times 10^{-6} K^{-1}$ over an operating temperature of the fuel cell stack system.

Further embodiments include methods of fabricating a reactant feed and return assembly for a fuel cell stack that include providing a metal powder in a preform shape corresponding to a first portion of the reactant feed and return assembly, sintering the metal powder in the preform shape, and bonding the first portion of the reactant feed and return assembly to at least one second portion of the reactant feed and return assembly using a brazing material.

BRIEF DESCRIPTION OF DRAWINGS

FIG. 6A is a data table illustrating the differences in the respective CTEs of grade 446 stainless steel and a chromium-iron alloy material as a function of temperature.

FIG. 6B is a table illustrating the chemical composition of a composition of a chromium-iron alloy material used to form at least a portion of a reactant feed and return assembly according to an embodiment.

FIG. 7A is an exploded view of an embodiment anode splitter plate (ASP) having a central splitter plate formed of grade 446 stainless steel sandwiched between two cover plates formed of a chromium-iron alloy.

FIG. 7B is a photograph of an embodiment ASP having a central splitter plate formed of grade 446 stainless steel sandwiched between two cover plates comprising a chromium-iron alloy.

FIG. 7C is a close-up photograph of grade 446 stainless steel material and chromium-iron alloy material brazed together with a brazing filler material.

FIG. 8A is an exploded view of an embodiment chromium-iron alloy ASP comprising grooves or trenches in upper and lower plate members which form internal fluid conduits in the assembled ASP.

FIG. 8B is an exploded view of an embodiment chromium-iron alloy ASP comprising grooves or trenches in a lower plate member which form internal fluid conduits in the assembled ASP.

FIG. 8C is an exploded view of an embodiment chromium-iron alloy ASP comprising a central plate and two cover plates sandwiching the central plate.

DETAILED DESCRIPTION OF THE EMBODIMENTS

The accompanying drawings, which are incorporated herein and constitute part of this specification, illustrate example embodiments of the invention, and together with the general description given above and the detailed description given below, serve to explain the features of the invention.

Figure 1:
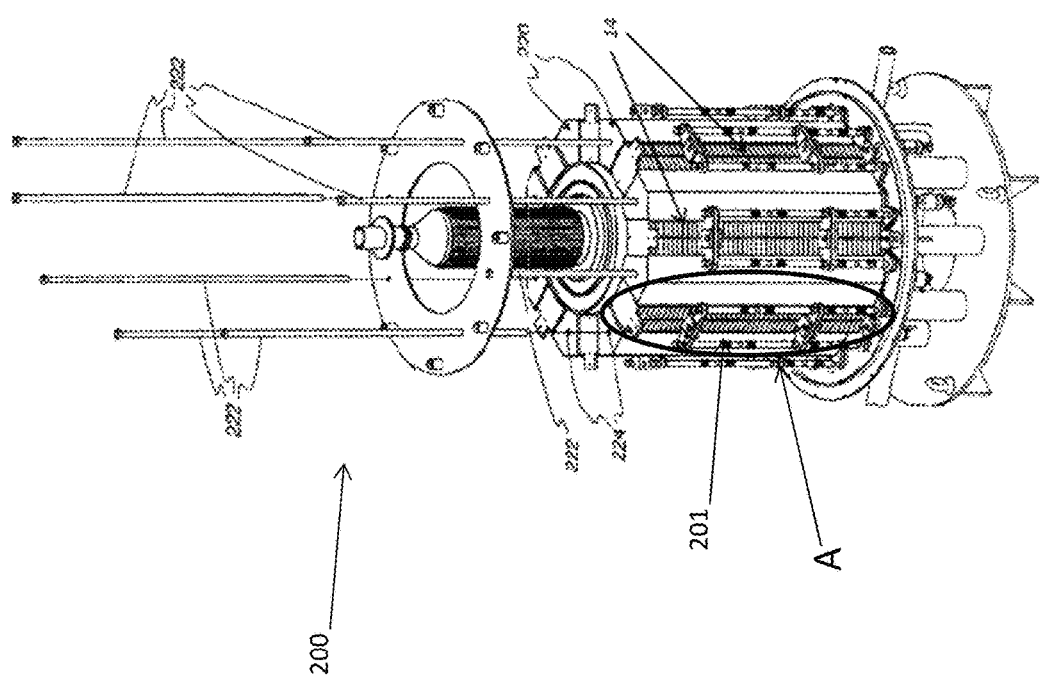
FIG. 1 is a perspective view of a prior art SOFC stack assembly.

FIG. 1 is a perspective partially-exploded view of a prior art SOFC stack assembly 200. In this embodiment, the SOFC stack assembly 200 includes a plurality of fuel cell stacks 14 that are internally manifolded for fuel and externally manifolded for air, although it will be understood that other configurations may be utilized, such as a system that is internally manifolded for air and externally manifolded for fuel, or a system that is internally manifolded for both fuel and air.

As shown in FIG. 1, wedge shaped ceramic side baffles 220 (e.g., having a non-uniform thickness and a roughly triangular cross sectional shape in the horizontal direction) are located between adjacent fuel cell stacks 14 (or columns 201 of fuel cell stacks), one of which is enclosed in area A. The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 1 also shows fuel distribution manifolds between the stacks in the stack column and fuel inlet and exhaust conduits connected to the manifolds. One skilled in the art will recognize that the embodiments described below are not limited to use in the specific assembly structure illustrated in FIG. 1.

Figure 2:
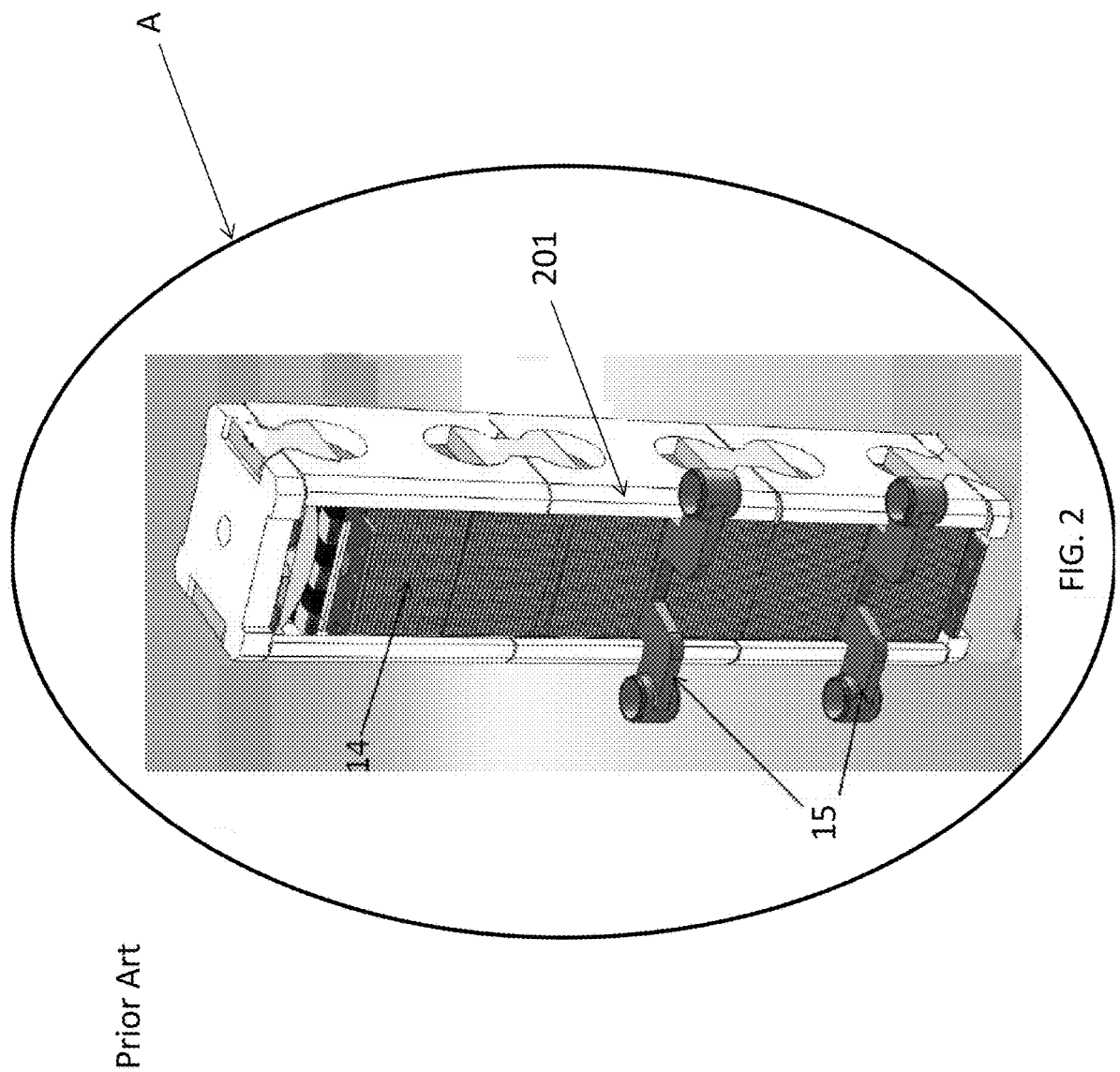
FIG. 2 is a perspective view of a prior art SOFC stack.

FIG. 2 is a perspective view of a column 201 including one or more fuel cell stacks 14 such as indicated in area A of FIG. 1. FIG. 2 shows a plurality of fuel cell stacks 14 each comprising vertically stacked fuel cells. The column 201 may include at least one feed/return assembly 15 for a reactant. For example, for a fuel cell system that is internally manifolded for fuel, the feed/return assembly 15 may be referred to as an anode feed/return assembly 15. The anode feed/return assembly 15 may be coupled to an anode feed port (not shown in FIG. 2) and may direct the anode feed (e.g., a fuel-containing reactant stream) into one or more fuel cell stacks 14 and may collect anode exhaust from the corresponding fuel cell stacks 14 and direct the anode exhaust into an exhaust port (not shown in FIG. 2). An anode feed/return assembly 15 may include a plate-shaped portion located within the column 201, such as between two fuel cell stacks 14 as illustrated in FIG. 2, and may also include fluid connector ports extending out from the column. The anode feed/return assembly 15 may direct anode feed into and collect anode exhaust from multiple fuel cell stacks 14 located above and below the anode reed/return assembly 15 in the column 201. Such an anode feed/return assembly 15 may also be referred to as an anode splitter plate (ASP). Any number of ASPs 15 may be provided between adjacent fuel cell stacks 14 as desired. Further, the number of fuel cell stacks 14 in a column 201 and/or the number of fuel cell stacks 14 between respective ASPs 15 may be selected as desired and is not limited to the configuration shown in FIG. 2.

Figure 3:
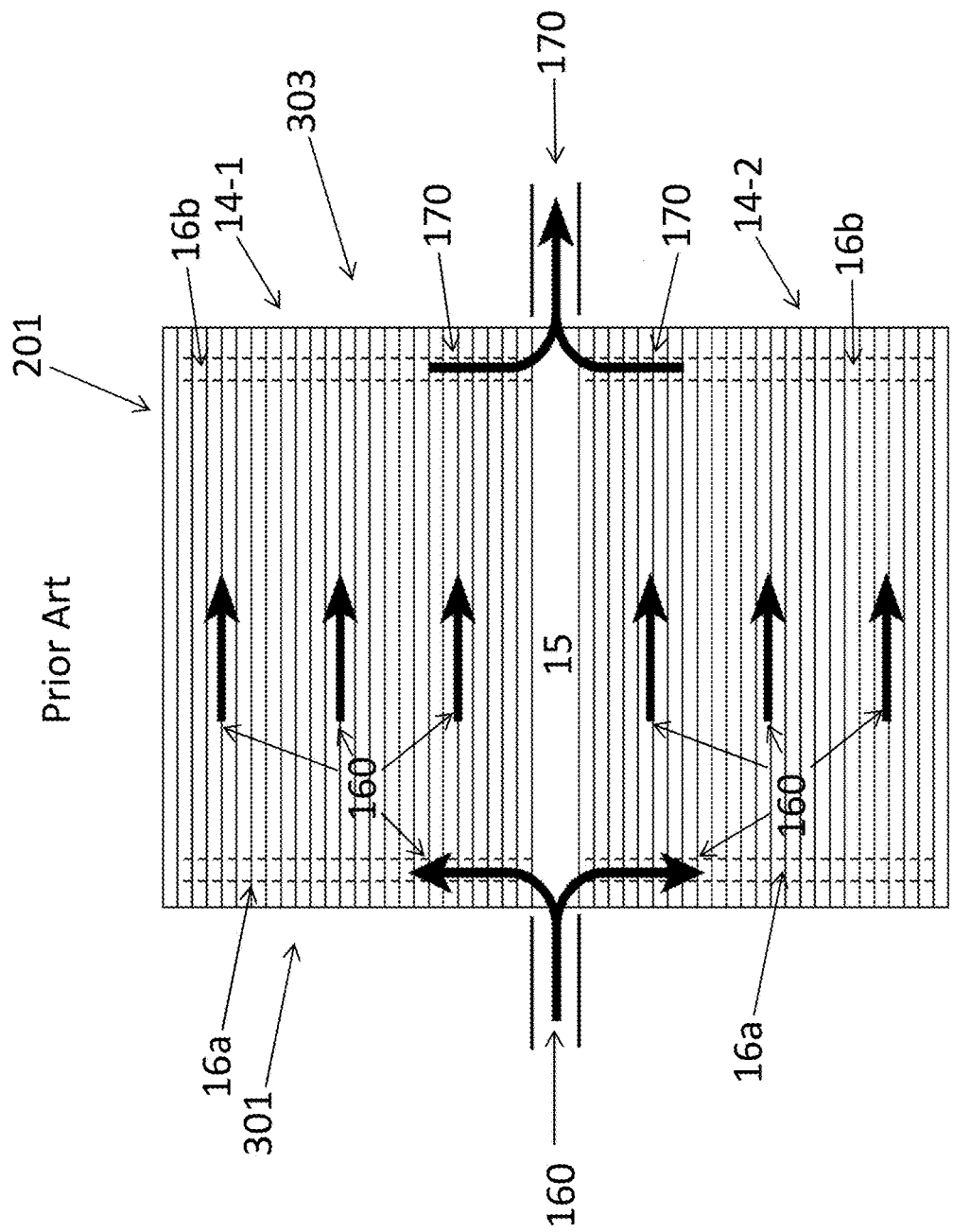
FIG. 3 is a schematic side cross sectional view of a prior art SOFC stack.

FIG. 3 is a schematic side cross sectional view of prior art column 201 which schematically illustrates the reactant flow path through an ASP 15 and multiple fuel cell stacks 14-1, 14-2. Fuel flow is illustrated by solid black arrows 160. Fuel is shown initially entering the ASP 15 from a first side 301 of the column 201, where it is distributed vertically throughout the stacks 14-1, 14-2 (e.g., within inlet riser channels 16a extending through the respective stacks 14-1, 14-2). As the fuel travels through each stack 14-1, 14-2 from the left side to the right side in FIG. 3, at least a portion of the fuel in the reactant stream is reacted in a fuel cell to generate electricity. As illustrated by solid black arrows 170, an exhaust stream including reaction products and any un-reacted fuel is then directed from various positions along the vertical axis of the right side of the stacks 14-1, 14-2 (e.g., through outlet riser channels 16b) to the ASP 15, where it exits from the second side of the column 201. ASP 15 thus manages incoming and outgoing reactant flow 160, 170.

Although FIG. 3 illustrates the fuel and exhaust streams entering and exiting the column 201 on opposite sides 301, 303 of the column 201, it will be understood that in various embodiments the fuel and exhaust streams may enter and exit the column on the same side of the column 201, such as in the configuration shown in FIG. 2. The ASP 15 may include an internal conduit (not shown in FIG. 3) that directs the incoming fuel stream 160 from the first side 301 of the column 201 into the respective inlet riser channels 16a of the stacks 14-1, 14-2. The ASP 15 may also include another internal conduit (not shown in FIG. 3) that directs the exhaust stream 170 from the respective outlet riser channels 16b of the stacks 14-1, 14-2 through the ASP to the first side 301 of the column 201, where the exhaust stream 170 may exit the column 201. The internal conduits of the ASP may be located at least partially within different planes (i.e., into and out of the page in FIG. 3).

Figure 4:
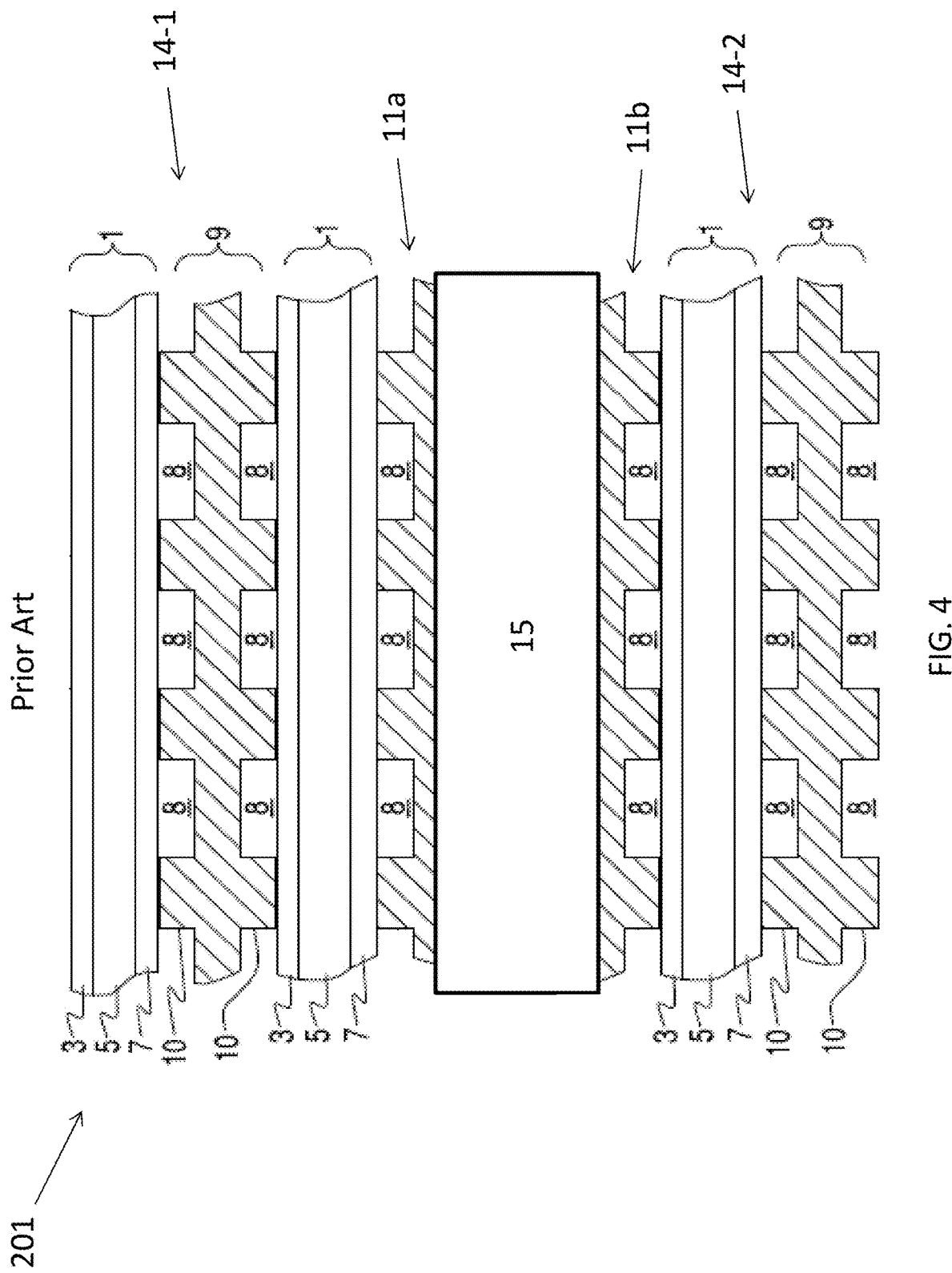
FIG. 4 is a side cross-section view of a prior art SOFC stack.

FIG. 4 is a side cross-sectional view of a portion of a prior art column 201 including a plurality of SOFC stacks 14-1, 14-2 and an ASP 15. The column 201 shown in FIG. 4 is rotated 90 degrees about the vertical axis from the column 201 shown in FIG. 3. Each SOFC 1 within a stack 14-1, 14-2 includes a cathode electrode 7, a solid oxide electrolyte 5, and an anode electrode 3. Fuel cell stacks are frequently built from a multiplicity of SOFC's 1 in the form of planar elements, tubes, or other geometries. Still further, while vertically oriented stacks are shown in FIG. 4, the fuel cells may be stacked horizontally or in any other suitable direction between vertical and horizontal. A major function of fuel cell stacks is to provide fuel and air to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of a portion of the stack 14, there may be an air endplate 11a or fuel end plate 11b for providing air or fuel, respectively, to the end electrode. The ASP 15 may be located between fuel cell stacks 14-1, 14-2 and interface with an air or a fuel endplate 11 of a first fuel cell stack 14-1 and an air or a fuel endplate 11 of a second fuel cell stack 14-2.

Figure 5A:
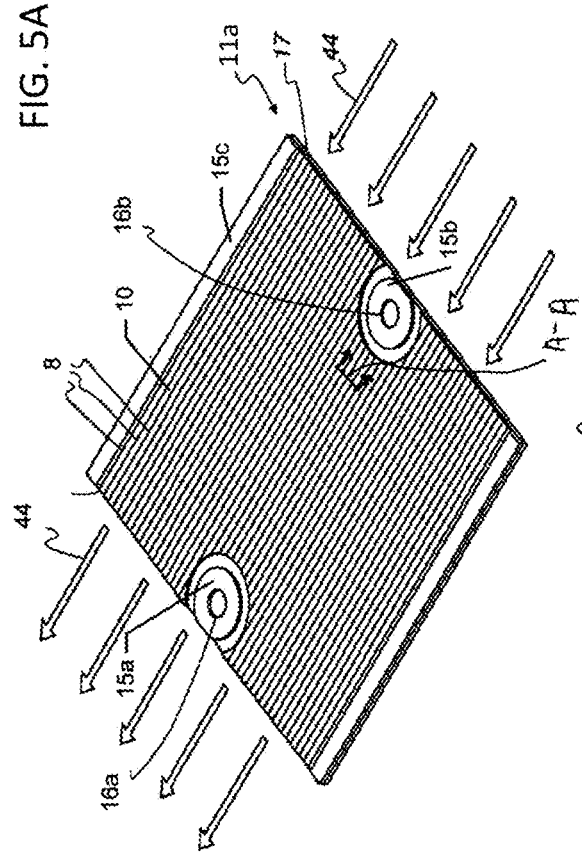
FIGS. 5A-5B are perspective views of prior art fuel flow in SOFC endplates.
Figure 5B:
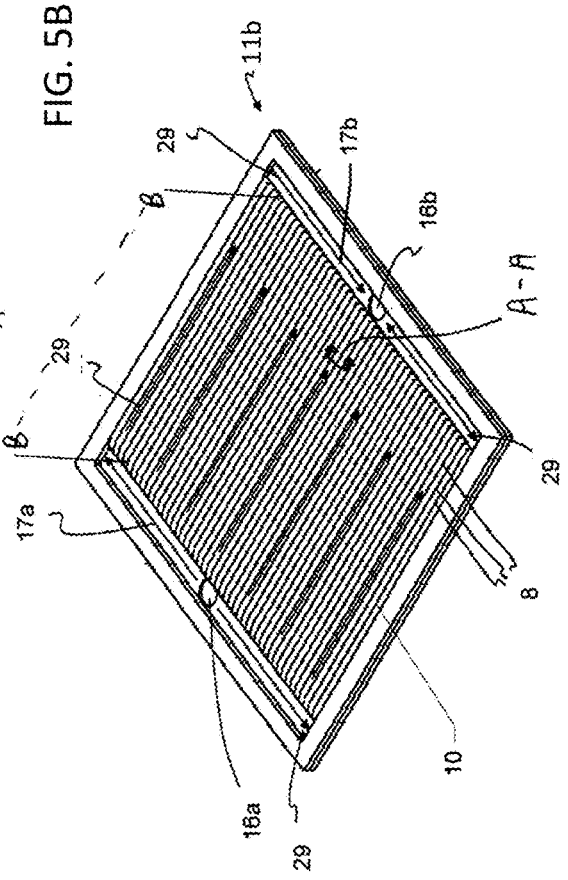

FIGS. 5A-5B are perspective views illustrating the flow of reactants in SOFC endplates 11a,b. FIG. 5A shows the top of air endplate 11a as shown in FIG. 4, and FIG. 5B shows the bottom of fuel endplate 11b as shown in FIG. 4. That is, the sides of endplates 11a,b that are not visible in FIGS. 5A-B are substantially flat and may be in direct contact with ASP 15 (not shown) when provided in SOFC stack 14, as illustrated in FIG. 4.

The portions of endplates 11a,b shown as side cross-sections in FIG. 4 are provided along lines A-A in FIGS. 5A-B. Turning first to FIG. 5B, fuel endplate 11b contains gas flow passages or channels 8 between ribs 10 for directing fuel flow. The fuel endplate 11b in this embodiment includes at least one riser channel 16a for providing fuel to the anode-side of an SOFC, as illustrated by arrow 29. The riser channel 16a generally comprises a fuel inlet riser opening or hole that extends through at least one layer of the fuel cells and interconnects in the stack. As illustrated in FIG. 5B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in fuel endplate 11b to an outlet plenum 17b and then exit through a separate outlet riser channel 16b.

The air endplate 11b, illustrated in FIG. 5A, may include gas flow passages or channels 8 between ribs 10 which direct air flow 44 over the cathode electrode of the fuel cell. Seals 15a, 15b may seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include a elevated top surface for contacting against the flat surface of the adjacent SOFC. A peripheral seal 15c can seal the anode-side of the fuel cell to prevent air from reaching the anode electrode of the fuel cell. Seals 15a-c may comprise glass material. Any of glass seals 15a-c may be provided to sufficiently pneumatically isolate the fuel from the air.

The reactant feed/return assemblies of a SOFC stack assembly, such as the anode splitter plates (ASP) described above, are typically made from a durable, electrically-conductive material with good resistance to high-temperature oxidation and corrosion, such as grade 446 stainless steel (SS446) sheet metal. Conventional ASPs made from SS446 material have been used to provide the functions of fuel delivery, electrical conduction and stack support as well as to provide suitable locations for thermocouples and electrical voltage probes.

The present inventors have discovered that a mismatch in coefficient of thermal expansion (CTE) between the materials typically used for the ASPs (e.g., SS446) and other components of the system, particularly the end plates of the adjacent SOFC stacks, may cause internal stresses to build in the SOFC stacks during thermal cycling, resulting in physical damage to SOFC components. For example, the resulting stress buildup on SOFC end plates may damage the glass seal sealing the SOFC stack, and may also result in cracking of the electrolytes in the SOFC stacks. Thus, there is a need for an ASP that preserves the structural integrity of the SOFC stack during thermal cycles.

In many cases, the end plates and interconnects of the SOFC are made of a chromium-based alloy, such as a Cr—Fe alloy, made by a powder metallurgy technique. The materials and processing conditions for fabricating the interconnects and end plates are typically selected such that the finished interconnect/end plates provides a good thermal match with other components of the SOFC, particularly the solid oxide electrolyte material of the fuel cells. A typical chromium-alloy interconnect/end plate may comprise at least about 80% chromium, and preferably more than about 90% chromium, such as about 94-96% (e.g., 95%) chromium by weight. The interconnect/end plate may contain less than about 20% iron, and preferably less than about 10% iron, such as about 4-6% (e.g., 5%) iron by weight. The interconnect/end plate may contain less than about 2%, such as about zero to 1% of other materials, such as yttrium or yttria, as well as residual or unavoidable impurities.

FIG. 6A is a data table illustrating the differences in the respective CTEs of SS446 material used in conventional ASPs and a chromium-iron alloy material used for fabricating interconnects and end plates of an SOFC as a function of temperature. SS446 material may include by weight 23-30% chromium and up to about 73% iron (e.g., by weight 23-30% Cr, <1.5% Mn, <0.75% Si, <0.5% Ni, 0.1-0.25% N, <0.12% C, <0.04% P, <0.003% S, balance Fe). As discussed above, stack endplates may comprise a chromium-iron alloy material comprising approximately 94-96% chromium and approximately 4-6% iron, such as approximately 95% chromium and approximately 5% iron. FIG. 6A illustrates a CTE mismatch between traditional anode splitter plate material (i.e., SS446) and stack endplates material (i.e., chromium-iron alloy). For example, at 850° C. there is a difference of $1.45 \times 10^{-6} K^{-1}$ in the respective material CTEs. This CTE mismatch may create severe issues for SOFC stack operation. For instance, the CTE mismatch can create a stress buildup on the stack endplates, potentially damaging the endplates and inhibiting SOFC function. Additionally, the stress buildup can cause the glass seals to break, permitting the fuel and air to mix and thereby hindering SOFC operation. The stress buildup may also lead to fuel leaks and faster degeneration of cells neighboring the stress buildup point.

Various embodiments include a reactant feed and return assembly for a fuel cell stack system, such as an anode splitter plate (ASP), that includes at least a first portion made from a chromium-based alloy that comprises at least about 80% chromium, and preferably more than about 90% chromium, such as about 94-96% (e.g., 95%) chromium by weight. The at least one first portion may contain less than about 20% iron, and preferably less than about 10% iron, such as about 4-6% (e.g., 5%) iron by weight. The at least one first portion may contain less than about 2%, such as about zero to 1% of other materials, such as yttrium or yttria, as well as residual or unavoidable impurities. The at least one first portion of the reactant feed and return assembly may comprise one or more outer surfaces of the assembly that contact an end plate of a fuel cell stack in the assembled fuel cell stack assembly.

Providing a reactant feed and return assembly, such as an ASP, comprising a chromium-based alloy material may minimize the CTE mismatch problem and the resulting stress buildup described above.

In one embodiment, a reactant feed and return assembly, such as an ASP, includes at least a first portion comprising a chromium-iron alloy comprising approximately 94-96% chromium and approximately 4.5%-5.5% iron, the reactant feed/return assembly further including a reactant feed opening for fluid engagement with a reactant feed conduit (e.g., tube), a reactant exhaust opening for fluid engagement with a reactant exhaust conduit (e.g., tube); a reactant feed channel within the reactant feed/return assembly configured to provide fluid communication between the reactant feed conduit and an inlet riser opening of a fuel cell stack; and a reactant exhaust channel within the reactant feed/return assembly configured to provide fluid communication between the reactant exhaust conduit and an outlet riser opening in the fuel cell stack. Example reactant (e.g., anode) feed tubes and exhaust tubes are described in further detail in U.S. Pat. No. 8,921,001, herein expressly incorporated by reference. In an embodiment, at least one of the reactant feed tube and exhaust tube are formed of an Inconel® series alloy, such as Inconel® 625 alloy. In an embodiment, at least one of the reactant feed tube and reactant exhaust tube comprise grade 446 stainless steel.

In an embodiment, the chromium-iron alloy further comprises approximately 0.02-0.2% yttrium or yttria. In an embodiment, the chromium-iron alloy further comprises a maximum of approximately 0.45% impurities. For example, FIG. 6B is a table illustrating an exemplary chemical composition of the chromium-iron alloy material. In the embodiment composition of FIG. 6B, the chromium-iron alloy comprises approximately 4.5-5.5% iron, a maximum of approximately 0.15% oxygen, a maximum of approximately 0.003% hydrogen, a maximum of approximately 0.12% aluminum, a maximum of approximately 0.03% nitrogen, a maximum of approximately 0.025% carbon, a maximum of approximately 0.12% silicon, and approximately 0.02-0.2% yttrium with the remaining percentage comprising chromium.

Further embodiments include a fuel cell stack system including a reactant feed and return assembly 15 adjacent to at least one fuel cell stack 14, such as shown in FIGS. 2-4, where at least a portion of the reactant feed and return assembly 15 that contacts an end plate 11 of the fuel cell stack 14 and is composed of a material that has a coefficient of thermal expansion (CTE) that differs from the CTE of the material of the end plate of the fuel cell stack 14 by less than $1.3 \times 10^{-6} K^{-1}$, such as $0.0-1.0 \times 10^{-6} K^{-1}$ over an operating temperature of the fuel cell stack system (e.g., 750° C.-950° C. for a SOFC system). In various embodiments, the reactant feed and return assembly 15 may be located between first and second fuel cell stacks 14, and at least the portions of the assembly 15 that contact the end plates of the first and second fuel cell stacks may be composed of a material that has a coefficient of thermal expansion (CTE) that differs from the CTE of the material(s) of the end plates of the respective fuel cell stacks 14 by less than $1.3 \times 10^{-6} K^{-1}$, such as $0.0-1.0 \times 10^{-6} K^{-1}$ over an operating temperature of the fuel cell stack system.

FIG. 7A is an exploded view of a reactant feed and return assembly 15 according to one embodiment. In this embodiment, the reactant feed and return assembly is an anode splitter plate (ASP) that includes a central plate 702 made of a first material and first and second cover plates 704a, 704b made of a chromium-based alloy that is different from the first material on opposite major surfaces of the central plate 702. The first and second cover plates 704a, 704b may be formed of a chromium-based alloy that includes at least about 80% chromium, and preferably more than about 90% chromium, such as about 94-96% (e.g., 95%) chromium by weight, less than about 20% iron, preferably less than about 10% iron, such as about 4-6% (e.g., 5%) iron by weight, and less than about 2%, such as about zero to 1% of other materials, such as yttrium or yttria, as well as residual or unavoidable impurities. In embodiments, the first and second cover plates 704a, 704b may have the same or substantially the same material composition as the end plates 11a, 11b of the adjacent fuel cell stacks 14-1, 14-2 when the ASP is assembled in a column 201 of an SOFC system (see FIGS. 2 and 4). For example, the cover plates 704a, 704b and end plates 11a, 11b may each comprise a chromium-iron alloy comprising approximately 94-96% chromium and approximately 4%-6% iron. In embodiments, the first and second cover plates 704a, 704b may be fabricated using a powder metallurgy process.

The central plate 702 may be made of a material that is commonly used for conventional ASPs, such as a grade 446 stainless steel (i.e., SS446) or an Inconel® alloy. The central plate 702 may be comprised of a material having less than about 50%, such as less than about 30% chromium by weight. The first cover plate 704a may be bonded, such as by brazing, to a first major surface 701 of the central plate 702, and the second cover plate 704b may be bonded, such as by brazing, to a second major surface 705 of the central plate 702.

An inlet riser opening 712a may be formed in the first cover plate 704a, an inlet riser opening 712b may be formed in the central plate 702, and an inlet riser opening 724c may be formed in the second cover plate 704b. The inlet riser openings 712a-c may comprise openings that extend fully through the first cover plate 704a, the central plate 702, and the second cover plate 704b, respectively. The inlet riser openings 712a-c may be located such that when the first cover plate 704a, central plate 704, and second cover plate 704b are bonded together, the inlet riser openings 712a-c form a continuous fluid passageway through which a reactant (e.g., fuel) may flow. One of ordinary skill in the art will understand that the inlet riser openings may be located in any location on the ASP.

In addition, an outlet riser opening 714a may be formed in the first cover plate 704a, an outlet riser opening 714b may be formed in the central plate 702, and an outlet riser opening 714c may be formed in lower cover plate 704b. The outlet riser openings 714a-c may comprise openings that extend fully through the first cover plate 704a, the central plate 702, and the second cover plate 704b, respectively. The outlet riser openings 714a-c may be located such that when the first cover plate 704a, central plate 704, and second cover plate 704b are bonded together, the outlet riser openings 714a-c form a continuous fluid passageway through which an exhaust stream may flow. One of ordinary skill in the art will understand that the outlet riser openings may be located in any location on the ASP.

The central plate 702 may also comprise projection portions 708a, 708b that extend on a side of the central plate 702 away from the first and second cover plates 704a, 704b. The projection portions 708a, 708b may be configured to extend out from the column 201 of fuel cell stacks 14 when the ASP 15 is assembled in an SOFC system, as shown in FIG. 2. The central plate 702 may include a first internal conduit (not visible in FIG. 7A) that extends between a reactant feed opening in the first projection portion 708a and the inlet riser opening 712b of the central plate 702 and a second internal fluid conduit (not visible in FIG. 7A) that extends between a reactant exhaust opening in the second projection portion 708b and the outlet riser opening 714b of the central plate 702. A reactant (e.g., anode) feed tube 706a may be bonded to, or integrally formed with, the first projection portion 708a. A reactant (e.g., anode) exhaust tube 706b may be bonded to, or integrally formed with, the second projection portion 708b. The feed tube 706a may be in fluid communication with the first internal fluid conduit of the central plate 702, such that reactant (e.g., fuel) from the feed tube 706a may flow from the reactant feed opening in the first projection portion 708a through the first internal fluid conduit to the inlet riser opening 712b in the central plate 702. From there, the reactant may flow in a first direction through the inlet riser opening 712a in the first cover plate 704a and into a first fuel cell stack of a column 201 (see FIG. 2) and in a second direction through the inlet riser opening 712c in the second cover plate 704b and into a second fuel cell stack of the column 201 (see FIG. 2).

Similarly, the exhaust tube 706b may be in fluid communication with the second internal fluid conduit of the central plate 702. Anode exhaust from adjacent fuel cell stacks 14 of the column 201 (i.e., located above and below the ASP 15 as shown in FIG. 2) may flow through outlet riser openings 714a, 714c of the respective first and second cover plates 704a, 704b to the outlet riser opening 714b of the central plate 702. From there, the exhaust stream may flow through the second internal fluid conduit to the second projection portion 708b of the central plate 702 and out through the exhaust tube 706b.

FIG. 7B is a photograph of an embodiment ASP 15 comprising a central plate 702 formed of SS446 material sandwiched between two cover plates 704a,704b formed of a chromium-iron alloy. Anode feed and exhaust tubes 706a,b are bonded to first and second projection portions 708a, 708b of the central plate 702. Cover plate 704a is bonded to the central plate 702 via brazing. Cover plate 704b (not visible in the view of FIG. 7B) is also bonded to the opposite side of the central plate 702 by brazing. An inlet riser opening 712 is formed as a continuous fluid passageway through the first cover plate 704a, central plate 702 and second cover plate 704b. An outlet riser opening 714 is formed as a continuous fluid passageway through the first cover plate 704a, central plate 702 and second cover plate 704b. The various components of the ASP 15 in FIG. 7B function similar to those described in FIG. 7A.

FIG. 7C is a micrograph of SS446 material 703 and chromium-iron alloy material 707 brazed together with a brazing material 710. For example, an SS446 material 703 may form the central plate 702 and a chromium-iron alloy material 707 may form the cover plates 704a, 704b. Providing a brazing material 710 between the central splitter plate 702 and cover plates 704a,b may provide for a sturdy and reliable ASP structure as shown in FIG. 7B. The brazing material may comprise any suitable brazing material having a lower melting point than either of materials 703 and 707, and may comprise, for example, a BNi5 and/or BNi9 paste. The BNi brazing materials comprise nickel alloy based brazing materials. For example, BNi5 may comprise 19 wt % Cr, 10.1 wt % Si, less than 0.1 wt % B and P (e.g., 0.03 and 0.02 wt % respectively) and balance nickel and unavoidable impurities. For example, BNi9 may comprise 15 wt % Cr, 3.6 wt % B, 1 wt % Fe, less than 0.1 wt % P (e.g., 0.02 wt %) and balance nickel and unavoidable impurities. The brazing material 710 may be melted and caused to flow within the interface between materials 703 and 707 and then cooled to bond the materials 703 and 707 together.

In a first embodiment, providing a chromium-based alloy (e.g., 95% Cr-5% Fe material) cover plate 704a, 704b for a reactant feed and return assembly 15 (e.g., an ASP) that directly interfaces with the end plate(s) of the adjacent fuel cell stack(s) may avoid the CTE mismatch and resultant stress buildup issues as described above. Further, the cover plate(s) 704 may be securely bonded to a central plate of the assembly 15 (e.g., ASP) that is made of a durable, high-temperature material, such as grade 446 stainless steel, using a brazing process. Such a brazing process may provide a secure bond between the chromium-based alloy (e.g., 95% Cr-5% Fe material) and the material of the central plate (e.g., SS446 material) and may avoid the issues of poor weldability of the chromium-based (e.g., 95% Cr-5% Fe material) powder metallurgical components of the fuel cell stack.

Further embodiments include reactant feed and return assemblies (e.g., ASPs) that are formed entirely or substantially entirely of a chromium-based alloy, such as a 95% Cr-5% Fe material formed by powder metallurgy.

FIG. 8A is an exploded, partially-transparent view of a reactant feed and return assembly 15 (e.g., an anode splitter plate, or ASP) according to another embodiment. In this embodiment, the assembly 15 includes a first plate member 804a (i.e., a cover plate) and a second plate member 804b (i.e., a cover plate) that may be bonded together to form the reactant feed and return assembly 15. Each of the plate members 804a, 804b may be formed of a chromium-based alloy that includes at least about 80% chromium, and preferably more than about 90% chromium, such as about 94-96% (e.g., 95%) chromium by weight, less than about 20% iron, preferably less than about 10% iron, such as about 4-6% (e.g., 5%) iron by weight, and less than about 2%, such as about zero to 1% of other materials, such as yttrium or yttria, as well as residual or unavoidable impurities. In embodiments, the first and second plate members 804a, 804b may have the same or substantially the same material composition as the end plates 11a, 11b of the adjacent fuel cell stacks 14-1, 14-2 when the reactant feed and return assembly 15 is assembled in a column 201 of an SOFC system (see FIGS. 2 and 4). For example, the plate members 804a, 804b and end plates 11a, 11b may each comprise a chromium-iron alloy comprising approximately 94-96% chromium and approximately 4%-6% iron. In embodiments, the first and second plate members 804a, 804b may be fabricated using a powder metallurgy process.

Each of the plate members 804a, 804b may include first and second projection portions 808a, 808b, similar to the projection portions 708a, 708b of the central plate 702 described above with reference to FIGS. 7A-B. The projection portions 808a, 808b may include openings 806a, 806b, 806c and 806d extending through the projection portions 808a, 808b, as shown in FIG. 8A. A first groove 816a (i.e., a continuous depressed region) may be formed in a first surface of the first plate member 804a (i.e. the upper surface of the plate member 804a in FIG. 8A), where the groove 816a may extend between the opening 806a in the projection portion 808a of the first plate member 804a and an inlet riser opening 812a which extends through the first plate member 804a. A corresponding groove 816a may also be formed in a first surface of the second plate member 804b (i.e., the lower surface of the plate member 804b in FIG. 8A), where the groove 816b may extend between the opening 806b in the projection portion 808a of the second plate member 804b and an inlet riser opening 812b which extends through the second plate member 804b. When the first and second plate members 804a, 804b are bonded together, the grooves 816a, 816b define a continuous internal fluid conduit extending between the openings 806a,b in the peripheral portion 808a of plate members 804a, 804b and an inlet riser opening 812 extending through the first and second plate members 804a, 804b.

A second groove 816c may be formed in the first surface of the first plate member 804a extending between the opening 806c in the projection portion 808b and an outlet riser opening (not visible in FIG. 8A). A corresponding groove 816d may also be formed in the first surface of the second plate member 804b extending between the opening 806d in the projection portion 808b of the second plate member 804b and an outlet riser opening which extends through the second plate member 804b. When the first and second plate members 804a, 804b are bonded together, the grooves 816c, 816d define a second continuous internal fluid conduit extending between the openings 806c,d in the peripheral portion 808b and an outlet riser opening extending through the first and second plate members 804a, 804b.

The first and second plate members 804a, 804b may be bonded together using a brazing process, such as described above. The shapes and surface structures of the plate members 804a, 804b, such as the grooves 816a-d, may be defined using a powder metallurgy "net shape" or "near net shape" powder pressing technique. Alternately or in addition, the shapes and structures of the plate members 804a, 804b may be defined using laser cutting and/or water jetting.

Tube members 706a-706d may be bonded to the projection portions 808a, 808b of each of the plate members 804a, 804b, as shown in FIG. 8A. Tube members 706a and 706b may be bonded to projection portion 808a such that they are in fluid communication with opening 806a in plate member 804a and opening 806b in plate member 804b, respectively, and may comprise feed tubes for a reactant (e.g., fuel). A second pair of tube members 706c and 706d may be bonded to projection portion 808b such that they are in fluid communication with opening 806c in plate member 804a and opening 806d in plate member 804b, respectively, and may comprise exhaust tubes for the reactant. Reactant (e.g., fuel) may enter the ASP 15 through one or both of tube members 706a and 706b, travel through the internal fluid conduit defined by grooves 816a and 816b and flow through the inlet riser openings 812a and 812b to fuel cell stacks located above and below the ASP 15 in a column 201 (see FIG. 2). Exhaust may enter the ASP 15 through outlet riser openings in plates 804a and 804b respectively, travel through the internal fluid conduit defined by grooves 816c and 816d and exit through one or both of tube members 706c and 706d.

The tube members 706a-706d may be formed of a material that is different from the material of plate members 804a, 804b. For example, the tube members 706a-706d may be made of a weldable metal material, such as an Inconel® alloy or SS446 material. The tube members 706a-706d may also comprise a non-conductive material such as a ceramic material (e.g., alumina). The tube members 706a-706d may be bonded to the plate members 804a, 804b using a brazing technique, such as described above.

FIG. 8B is an exploded, partially transparent view of an alternative embodiment of a reactant feed and return assembly 15 (e.g., an anode splitter plate, or ASP). The embodiment shown in FIG. 8B is similar to the embodiment of FIG. 8A described above, except that unlike in the embodiment of FIG. 8A, there is no groove formed in the surface of the second plate member 804b. Thus, the internal fluid conduits of the ASP are defined by grooves 816a, 816b formed in the surface of the first plate member 804a, which are enclosed by the surface of the second plate member 804b when the first and second plate members 804a, 804b are bonded together (e.g., via a brazing process as described above). In this embodiment, the second plate member 804b may be formed as a generally flat plate having openings 806b, 806c in the projection portions 808a, 808b and inlet and outlet riser openings 812b and 814b, as shown in FIG. 8B. The second plate member 806b may lack surface features, such as the grooves 816a, 816b in the first plate member 804a.

The structure, operation and materials of the reactant feed and return assembly 15 of FIG. 8B may be otherwise similar to those described above with reference to FIG. 8A. In some embodiments, the second plate member 804b may be fabricated by forming a flat plate (e.g., via powder metallurgy) and forming the shape and/or openings of the plate member 804b via laser cutting and/or water jetting.

FIG. 8C is an exploded view of another embodiment reactant feed and return assembly 15 (e.g., an anode splitter plate, or ASP). The embodiment shown in FIG. 8C may be similar to the embodiments shown and described above with reference to FIGS. 8A and 8B. The embodiment of FIG. 8C includes three plate members, 804a, 804b and 804c which may be bonded together to form the reactant feed and return assembly 15. Each of the plate members 804a, 804b, 804c may be formed of a chromium-based alloy (e.g., 95% Cr-5% Fe material) as described above, and may be fabricated using a powder metallurgy process. The FIG. 8C embodiment differs from the FIGS. 8A-8B embodiments in that both the first and second plate members 804a, 804b may be formed as a generally flat plate having openings 806a-d in the projection portions 808a, 808b and inlet and outlet riser openings 812a, b and 814a-b through the plate members 804a, 804b, where the plate members 804a, 804b may lack surface features, such as grooves, defining internal fluid conduits of the ASP.

The embodiment of FIG. 8C includes a third plate member 804c that is sandwiched between the first and second plate members 804a and 804b in the assembled ASP. The plate members 804a, 804b and 804c may be bonded together using a brazing process. The third plate member 804c is formed with continuous open regions 807a, 807b extending through the third plate member 804c as shown in FIG. 8C. When the plate members 804a-804c are aligned and bonded together, the open regions 807a, 807b in plate member 804c are enclosed by the surfaces of plate members 804a and 804b on both sides of plate member 804c to form internal fluid conduits within the ASP. A first conduit is defined by open region 807a and extends between the openings 806a and 806b in the projection region 808a of the ASP and the inlet riser openings 812a and 812b. A second conduit is defined by open region 807b and extends between the openings 806c and 806d in the projection region 808b of the ASP and the outlet riser openings 814a and 814b. The structure, operation and materials of the reactant feed and return assembly 15 of FIG. 8C may be otherwise similar to those described above with reference to FIGS. 8A and 8B. In some embodiments, the first, second and third plate members 804a, 804b and 804c may each be fabricated by forming a flat plate (e.g., via powder metallurgy) and forming the shape(s) and/or openings of the respective plate members via laser cutting and/or water jetting.

Figure 8D:
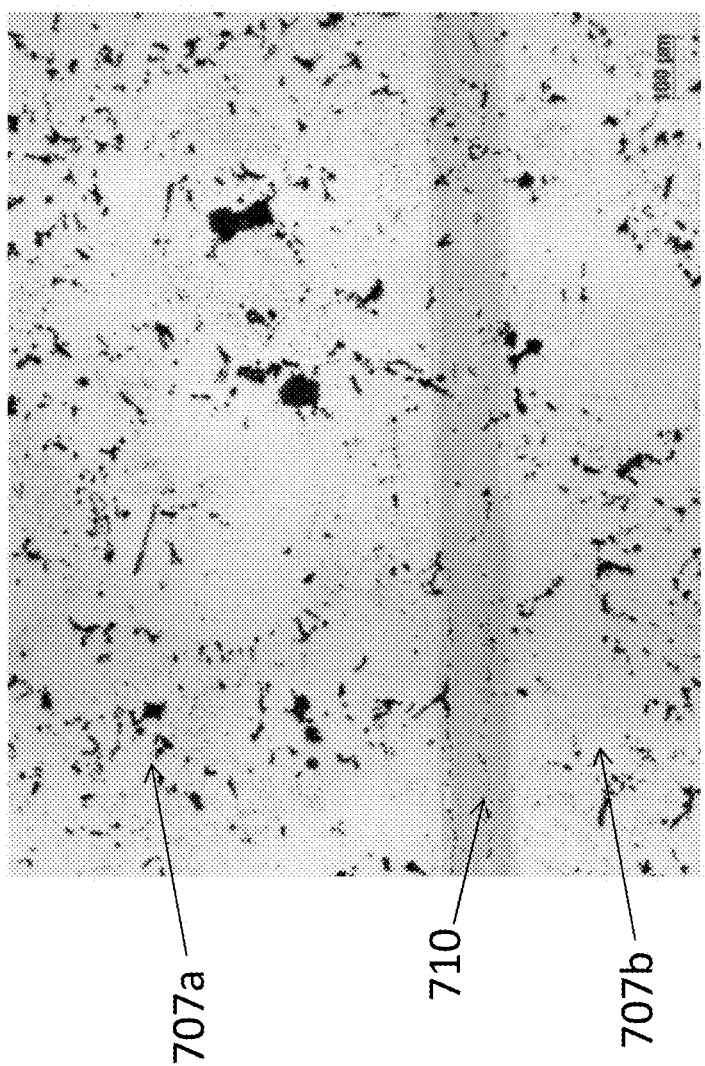
FIG. 8D is a micrograph of a chromium-iron alloy structure brazed to another chromium-iron alloy structure with a brazing filler material.

FIG. 8D is a is a micrograph of two chromium-iron alloy materials 707a, 707b brazed together with a brazing material 710. For example, a chromium-iron alloy material 707a (e.g., 95% Cr-5% Fe material) may form a plate member 804a, 804b or 804c of a reactant feed and return assembly as shown in FIGS. 8A-8C and a chromium-iron alloy material 707b (e.g., 95% Cr-5% Fe material) may form another plate member 804a, 804b or 804c of the reactant feed and return assembly. The materials 707a, 707b may be bonded together using a brazing material 710 to provide for a sturdy and reliable structure for the reactant feed and return assembly. The brazing material may comprise any suitable brazing material having a lower melting point than materials 707a and 707b, and may comprise, for example, a BNi5 and/or BNi9 paste. The brazing material 710 may be melted and caused to flow within the interface between materials 707a and 707b and then cooled to bond the materials 707a, 707b together.

In a further embodiment, a reactant feed and return assembly (e.g., ASP) may have a main body that is formed by an additive manufacturing technique, such as a 3D printing process. FIG. 9A illustrates a main body 904 of a reactant feed and return assembly that may be formed by additive manufacturing. In various embodiments, the main body 904 may be formed by sequentially depositing layers of a powder material (e.g., a chromium and iron containing powder, such as a 95% Cr-5% Fe powder stock) and laser sintering the material to fuse the powder material and form a solid main body 904 having a desired three-dimensional structure. The main body 904 in this embodiment may include an inlet riser opening 912 and an outlet riser opening 914 extending through the main body 904. Connector portions 918a and 918b may protrude from a side of the main body 904 as shown in FIG. 9A. A first internal fluid conduit (not visible in FIG. 9A) may extend within the main body 904 between a first connector portion 918a and the inlet riser opening 912. A second internal fluid conduit (not visible in FIG. 9A) may extend within the main body 904 between a second connector portion 918b and the outlet riser opening 914.

Figure 9B:
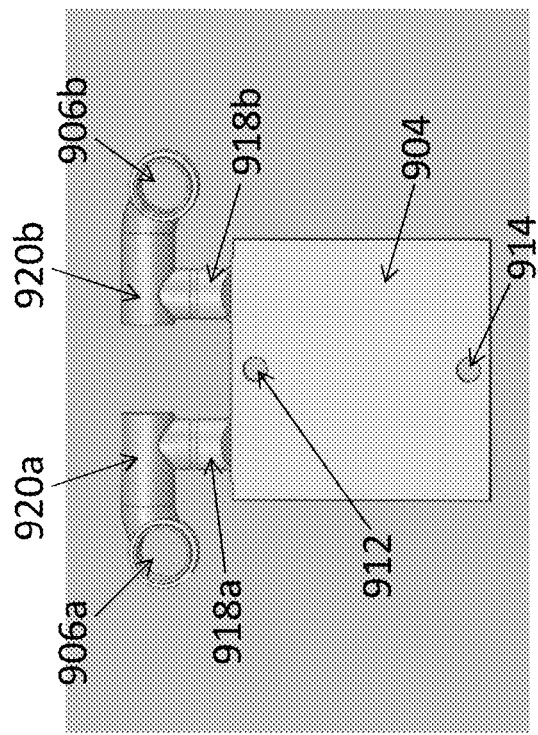
FIG. 9B is a top view of a 3D printed main body of an embodiment ASP comprising a chromium-iron alloy with brazed stainless steel elbows.
Figure 9A:
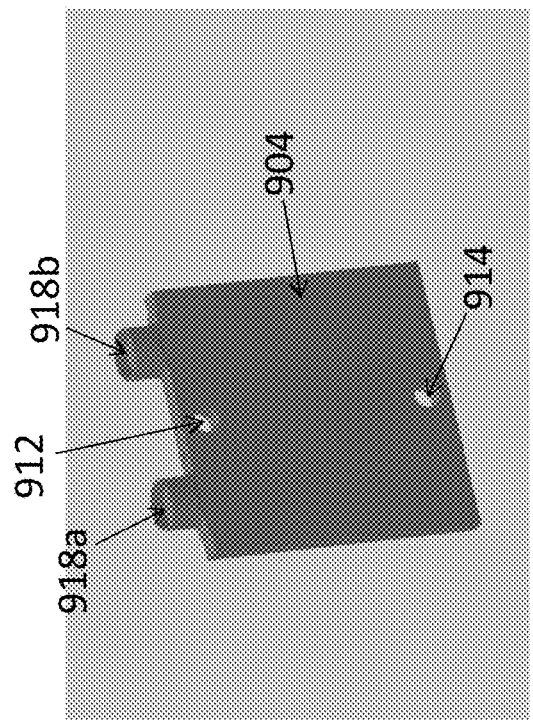
FIG. 9A is a perspective view of a 3D printed main body of an embodiment ASP comprising a chromium-iron alloy.

Elbow connectors 920a, 920b may be attached to the respective connector portions 918a and 918b of the main body 904, as shown in FIG. 9B. The elbow connectors 920a, 920b may be made from a material that is different from the material of the main body 904. For example, the elbow connectors may be formed of grade 446 stainless steel or another suitable metal material, such as a super ferrite material. The elbow connectors 920a, 920b may provide a fluid connection between the connector portions 918a, 918b of the main body 904 and tube members 906a, 906b that are generally perpendicular to the major surfaces of the main body 904.

Figure 9C:
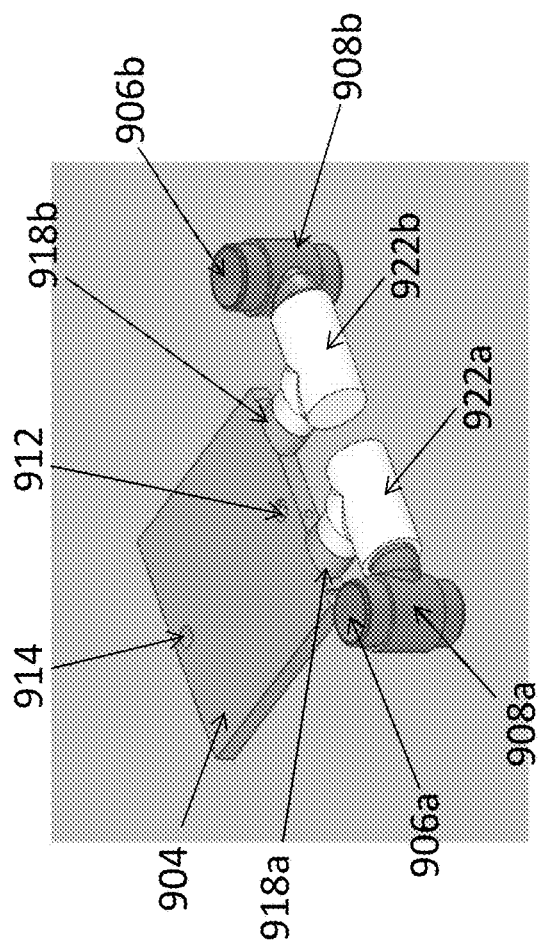
FIG. 9C is a perspective view of a 3D printed main body of an embodiment ASP comprising chromium-iron alloy material with brazed ceramic elbows and stainless steel anode feed and exhaust tubes.

In an alternative embodiment shown in FIG. 9C, the elbow connectors 922a, 922b may comprise a non-conductive material, such as a ceramic material. In one embodiment, the elbow connectors 922a, 922b are formed of an alumina and/or a stabilized zirconia, such as yttria-stabilized zirconia (YSZ). The ceramic elbow connectors 922a, 922b may provide a non-conductive, dielectric portion of the reactant feed and return assembly 15. Fittings 908a, 908b including tube members 906a, 906b may be attached to the elbow connectors 922a, 922b. The fittings 908a, 908b may be made of a metal material (e.g., SS 446 material or an Inconel® alloy) and may provide a weldable interface to the reactant feed and return assembly 15. In various embodiments, the ceramic elbow connectors 922a, 922b may be bonded to the main body 904 and/or the metal fittings 908a, 908b may be bonded to the ceramic elbow connectors 922a, 922b via a brazing process as discussed above.

Figure 10A:
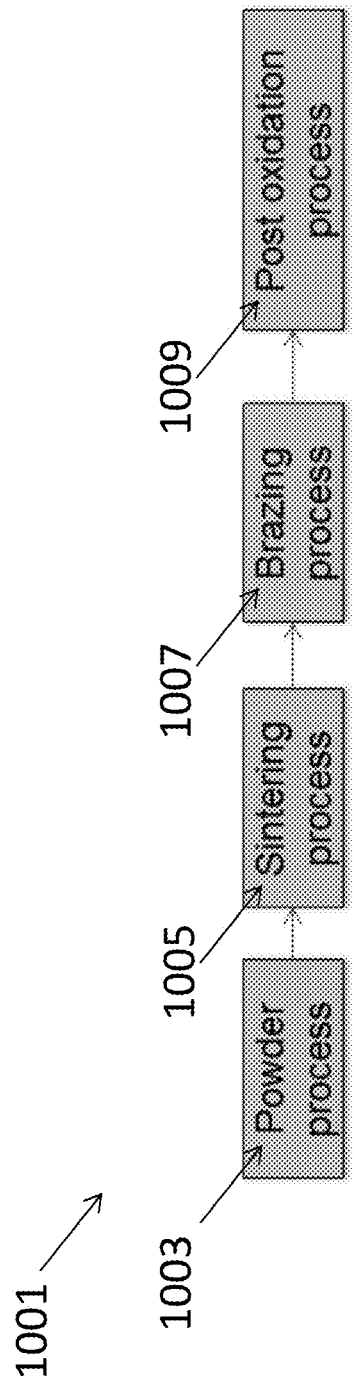
FIGS. 10A-B are flowcharts demonstrating methods for manufacturing embodiment reactant feed and return assemblies (e.g., ASPs).

Various embodiments include methods of fabricating a reactant feed and return assembly for a fuel cell stack, such as an anode splitter plate (ASP), that includes at least a first portion made from a chromium-based alloy that comprises at least about 80% chromium, such as a chromium-iron alloy comprising approximately 94-96% chromium and approximately 4.5%-5.5% iron. FIG. 10A is a flow diagram illustrating a first embodiment method 1001 of fabricating a reactant feed and return assembly. The method 1003 may include forming a first portion of the reactant feed and return assembly using a powder process 1003. The powder process 1003 may comprise providing a chromium-containing metal powder and shaping the powder into a pre-form shape. The pre-form shape may be in the shape of a cover plate 704a, 704b as shown in FIGS. 7A-B, a plate member 804a, 804b, 804c such as shown in FIGS. 8A-8C or a main body 904 such as shown in FIGS. 9A-9C, for example. In some embodiments, the pre-form shape may be formed using a powder metallurgy process by compacting metal powders using a powder press apparatus to form a "net shape" or "near net shape" pressed powder part. (Additional details of a powder metallurgy technique for fabrication of chromium-iron SOFC interconnects are disclosed in U.S. Publication No. 2015/024404 ("the '404 Publication"), which is incorporated by reference herein. A similar technique as disclosed in the '404 Publication may be used to fabricate at least a portion of a reactant feed and return assembly). The pressed powder part may be subjected to additional post-compaction processing, such as laser cutting, water jetting or other machining processes, to provide the pre-form shape. In some embodiments, the pre-form shape may be formed using an additive powder manufacturing process, such as 3D printing, as described above with reference to FIGS. 9A-9C.

The method 1001 may also include a sintering process 1005 that is performed subsequent to the powder process 1003. In embodiments, the sintering process 1005 may include subjecting at least the first portion of the reactant feed and return assembly formed by a powder process 1003 to a hydrogen environment (e.g., pure hydrogen or a mixture of hydrogen and one or more other gases) at an elevated temperature (e.g. 1150-1500° C., such as 1400-1450° C.). Sintering may enhance the structural integrity of the first portion and may promote interdiffusion of metal elements (e.g., Cr and Fe). The sintering process may also be preceded by an optional "debinding" process to remove organic lubricants or binders from the pre-form shape, which may be carried out in a furnace at a temperature of 200-800° C.

Sintering the first portion may be accomplished by any means known to one of ordinary skill in the art. For example, in an embodiment, sintering the first portion may comprise laser sintering of the first portion, which may be formed by a laser printing process.

In the embodiment of FIG. 10A, the sintering process 1005 may be followed by a brazing process 1007. The brazing process 1007 may be used to join the first portion of the reactant feed and return assembly with at least one other portion of the assembly. For example, the brazing process 1007 may be used to bond the cover plate(s) 704a, 704b to the central plate 702, as shown in FIGS. 7A-B, or to join plate member 804a, 804b and/or 804c, as shown in FIGS. 8A-8C. The brazing process 1007 may also be used to attach the tube members 706a-706d (see FIGS. 7A-8C), elbow connector(s) 920a-b, 922a-b (see FIGS. 9B-9C) and/or tube members 908a-b (see FIGS. 9B-9C) to the main body of the reactant feed and return assembly. Thus, in embodiments, the brazing process 1007 may be used to join the various components to form the final structure of the reactant feed and return assembly. The various components may be joined (i.e., brazed) in a single brazing step or various components may be joined in separate brazing steps to form sub-assemblies which may then be joined (e.g., via brazing) to provide the final structure.

Following the sintering and brazing steps, all or a portion of the reactant feed and return assembly may be subjected to an optional oxidation process 1009. The oxidation process 1009 may comprise a separate controlled oxidation treatment by exposure to an oxidizing ambient, such as air at high temperature. The oxidation process 1009 may cause an oxide material (e.g., chromium oxide, such as $Cr_2O_3$) to be formed on surfaces of the structure, including within internal pores of the chromium-based alloy material. This internal oxide formation may provide improved thermal stability when the reactant feed and return assembly is incorporated into a fuel cell stack system. Oxide material on the outer surfaces of the assembly may optionally be removed before use, such as by grit blasting or grinding.

Figure 10B:
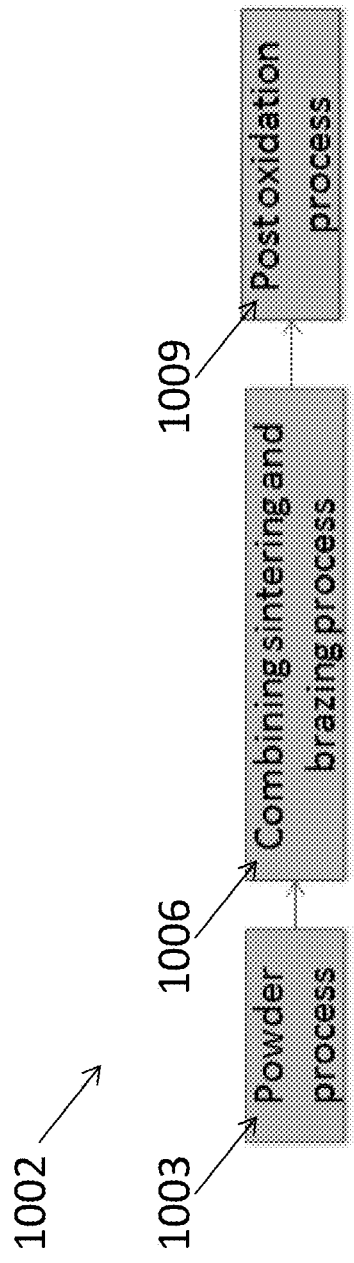

FIG. 10B is a flow diagram illustrating an alternative fabrication method 1002. This method 1002 is similar to method 1001 with the exception that the sintering and brazing steps as described above are combined in a combined sintering and brazing step 1006. For example, the sintering and brazing may occur in the same thermal cycle, such that the assembly may be subjected to an elevated temperature for a sufficient duration to both sinter the powder material and cause the brazing material to melt and flow into the interface between components to bond the components. In this embodiment, because the reactant feed and return assembly sintering may take place at high temperatures such as 1400-1500° C., the brazing filler material should be operative at high temperatures and may comprise, for example, In625 material, SS446 material, or an equivalent super ferrite foil, powder, or other suitable physical form.

In an alternative embodiment, instead of using powder metallurgy to form one or more of the parts of the anode splitter plate described above, a sheet metal forming process may be used instead. For the example one or more of the Cr—Fe alloy cover plates and/or central plate described above may be formed by a sheet metal forming process, such as one or more of roll forming, stamping, stretch forming, drawing, peen forming, etc. In this process, a sheet of the Cr—Fe alloy is shaped into a desired part of the anode splitter plate, such as cover plate and/or central plate. In the case that one or more sheet metal formed parts are formed from a material different from the Cr—Fe alloy which has a CTE mismatch with the adjacent fuel cell stacks, then such material CTE mismatch can be reduced or eliminated by using the split cover plates in which each cover plate is made of separate first and second sheet metal pieces separated by an expansion zone. The expansion zone permits expansion of the sheet metal pieces during high temperature operation.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell stack system, comprising:
a column comprising at least a first fuel cell stack and a second fuel cell stack; and
a reactant feed and return assembly located between the first fuel cell stack and the second fuel cell stack in the column, wherein at least the outer surfaces of the reactant feed and return assembly that contact the respective end plates of the first fuel cell stack and the second fuel cell stack are formed of a material that has a coefficient of thermal expansion (CTE) that differs from the CTE of the respective end plates of the first fuel cell stack and the second fuel cell stack by less than $1.3 \times 10^{-6} K^{-1}$ over an operating temperature of the fuel cell stack system.

2. A fuel cell stack system, comprising a column comprising:
a first stack of fuel cells;
a second stack of fuel cells;
an inlet riser configured to provide a fluid to the fuel cells;
an outlet riser configured to receive a fluid to the fuel cells; and
a reactant feed and return assembly having a first surface that contacts a lower end plate of the first stack and a second surface that contacts an upper end plate of the second stack;
wherein the first and second surfaces are formed of a material that has a coefficient of thermal expansion (CTE) that differs from the CTE of the upper and lower end plates by less than $1.3 \times 10^{-6} K^{-1}$ over an operating temperature range of the fuel cell stack system.

3. The fuel cell stack system of claim 2, wherein:
the fuel cells comprise solid oxide fuel cells; and
the operating temperature range is from 750 to 950° C.

4. The fuel cell stack system of claim 3, wherein the upper and lower end plates and the first and second surfaces are formed of a chromium-based alloy comprising at least 80% chromium by weight.

5. The fuel cell stack system of claim 4, wherein the chromium-iron alloy comprises 94-96% chromium by weight and 4-6% iron by weight.

6. The fuel cell stack system of claim 5, wherein the chromium-iron alloy further comprises 0.02-0.2% yttrium or yttria, and a maximum of 0.45% of residual or unavoidable impurities.

7. The fuel cell stack system of claim 4, wherein the reactant feed and return assembly comprises:
a reactant feed opening fluidly connected to a reactant feed conduit of the system;
a reactant exhaust opening fluidly connected to a reactant exhaust conduit of the system;
an inlet riser opening fluidly connected to the inlet riser;
an outlet riser opening fluidly connected to the outlet riser;
a reactant feed channel fluidly connecting the reactant feed conduit and the inlet riser opening; and
a reactant exhaust channel fluidly connecting the anode exhaust conduit and an outlet riser opening.

8. The fuel cell stack system of claim 7, wherein the reactant feed and return assembly comprises:
a first cover plate having the first surface and formed of the formed of the chromium-based alloy; and
a second cover plate having the second surface formed of the formed of the chromium-based alloy.

9. The fuel cell stack system of claim 8, wherein the first and second cover plates are formed by a powder metallurgy powder pressing process.

10. The fuel cell stack system of claim 8, wherein the first and second cover plates are formed by a sheet metal forming process.

11. The fuel cell stack system of claim 8, wherein the first and second cover plates are bonded together for form a main body of the reactant feed and return assembly.

12. The fuel cell stack system of claim 11, wherein at least one of the first and second cover plates comprises grooves that define the reactant feed channel and the reactant exhaust channel when the first and second cover plates are bonded together.

13. The fuel cell stack system of claim 12, wherein at least one of:
   (a) the first cover plate comprises grooves formed in a surface and the second cover plate comprises a substantially flat surface that interfaces with the first cover plate;
   (b) both the first cover plate and the second cover plate comprise grooves formed in their respective interfacing surfaces; and
   (c) the first and second cover plates are bonded together by a brazing material.

14. The fuel cell stack system of claim 8, wherein:
   the reactant feed and return assembly comprises a central plate disposed between the first and second cover plates; and
   the central plate comprises open regions the define the reactant feed channel and the reactant exhaust channel when the first and second cover plates are bonded to the central plate.

15. The fuel cell stack system of claim 14, wherein the first and second cover plates are bonded to the central plate by a brazing material.

16. The fuel cell stack system of claim 14, wherein the central plate comprises a metal material having less than 50% chromium by weight.

17. The fuel cell stack system of claim 14, wherein:
   (a) the central plate comprises at least one of grade 446 stainless steel or an Inconel alloy; and
   (b) the brazing material comprises at least one of a BNi5 and a BNi9 paste.

18. The fuel cell stack system of claim 14, wherein the central plate comprises a chromium-based alloy comprising at least 80% chromium by weight and is formed by a powder metallurgy powder pressing process.

19. The fuel cell stack system of claim 7, wherein the reactant feed and return assembly further comprises:
   first and second projections extending from a side of the reactant feed and return assembly, the reactant feed channel extending between the first projection and the inlet riser opening and the reactant exhaust channel extending between the second projection and the outlet riser opening;
   a first tube member bonded to the first projection and in fluid communication with the reactant feed channel; and
   a second tube member bonded to the second projection and in fluid communication with the reactant exhaust channel.

* * * * *